Jan. 23, 1923. 1,443,258.
A. GRANAT.
AUTOMOBILE TIRE.
FILED SEPT. 19, 1922.

Abraham Granat.
INVENTOR
BY Victor J. Evans
ATTORNEY

WITNESS: Fred W. Ely,

Patented Jan. 23, 1923.

1,443,258

UNITED STATES PATENT OFFICE.

ABRAHAM GRANAT, OF NEW YORK, N. Y.

AUTOMOBILE TIRE.

Application filed September 19, 1922. Serial No. 589,203.

*To all whom it may concern:*

Be it known that I, ABRAHAM GRANAT, a citizen of United States, residing at New York, in the county of New York and State of New York, have invented new and useful Improvements in Automobile Tires, of which the following is a specification.

This invention relates to pneumatic tires and tubes.

I do not wish to limit myself in connection with the use of the invention and in the description will refer to it generally as a tire. However, it is to be understood that it may be used as an inner tube and inserted in an ordinary outer casing of suitable well known construction.

An object of the invention is to provide a tire having a multiplicity of cells adapted to contain air and improved means for closing the cells from each other pneumatically so as to trap and retain the air in the cells, whereby in the event of puncture in line with one of the cells, the buoyancy of the tire will not be destroyed.

Another object of the invention is to provide a tire of this character which will consist of separate buoyant portions, one of which is divided into a number of cells each adapted to contain a charge of air and the other operating in improved manner to constantly retain a charge of air and to operate with respect to the cells so as to close communication between same.

Another object of the invention is to provide a tire of this character which will be simple of construction, positive of action and of a form which will provide the tire with maximum buoyant qualities.

With the above and other objects in view which will appear as the nature of the invention is better understood, the same consists in the improved construction and novel arrangements of parts which will hereinafter be fully described and particularly pointed out in the claim.

In the accompanying drawings, has been illustrated, a single and preferred form of the invention, it being, however, understood that no limitations are necessarily made to the precise structural details therein exhibited, but that changes, alterations and modifications within the scope of the claim may be resorted to when desired.

Figure 1:
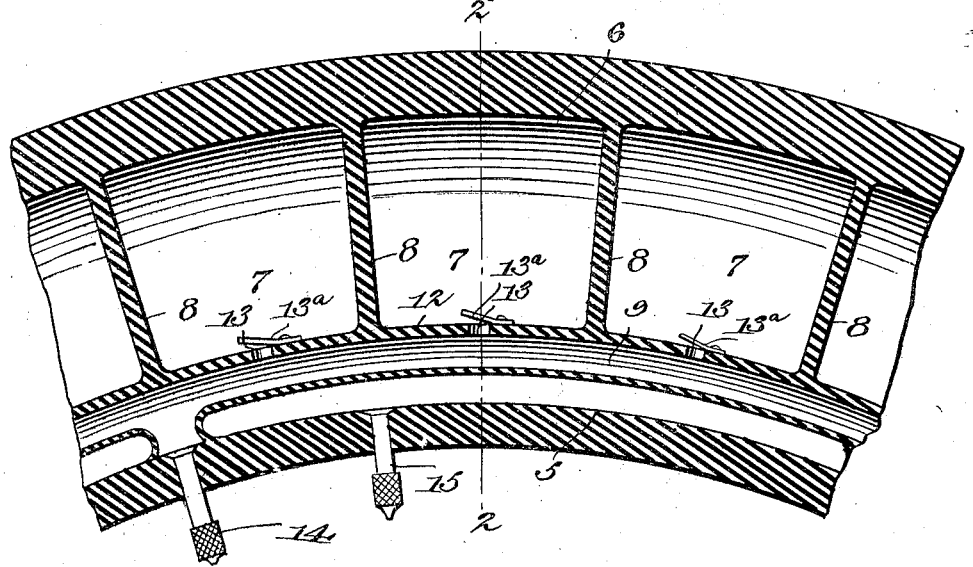
Figure 1, is a longitudinal section through a portion of a tire constructed in accordance with my invention.
Figure 2:
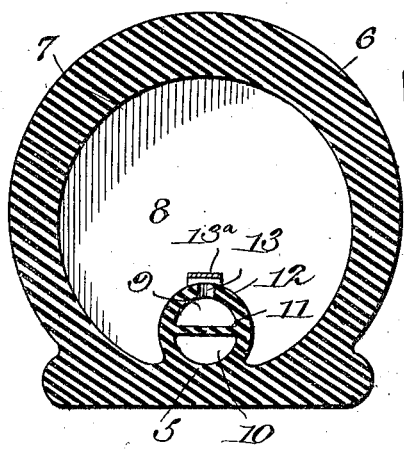
Figure 2, is a transverse section therethrough taken on line 2—2 of Figure 1.

In carrying the invention into practice, use is made of a tire body provided with separated inner and outer tubular buoyant portions 5 and 6, the latter constituting the tread of the tire and the former being arranged adjacent to the rim engaging part thereof. The outer portion 6, is divided into a plurality of air cells 7, which are separated from each other by transverse webs or partitions 8. The inner tubular portion 5 is normally divided by a diaphragm 11 into two concentric channels 9 and 10, the said diaphragm or wall 11 being formed of suitable elastic material capable of being distended under the action of air compressed in the channel 10 so as to tightly bear against the wall 12 of the cells 7. The purpose of this construction will be described hereinafter.

Figure 3:
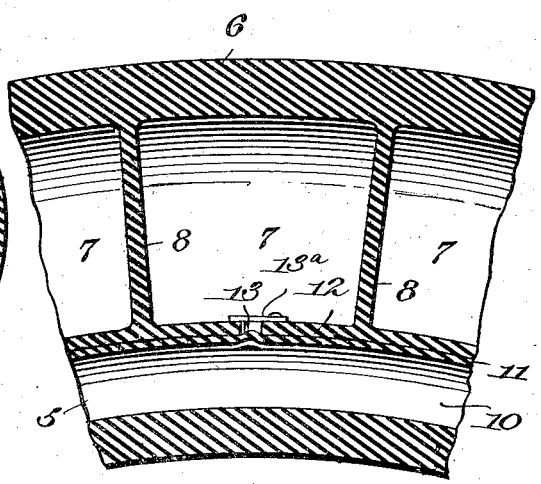
Figure 3, is a view similar to Figure 1, showing the means for closing the cells with respect to each other.

The wall 12 is provided with openings 13 one for each of the cells 7. These openings are operatively related to the diaphragm or wall 11 so that under pressure of air in the channel 10, said wall will close against the openings as shown in Figure 3, the diaphragm or wall then acting as a valve for all of the cells 7. In this manner, the cells are closed against communication with each other for a purpose which will presently appear. Leading to the channel 9 is a valve 14, which is arranged to open inwardly so that when the valve is connected with the usual well known form of air pump, air will be taken into the channel 9 and into the cells 7, by way of the perforations 13. The valve 14 acts to prevent escape of air from the channel 9 and said cells 7. Leading to the channel 10 is a similar valve 15.

After the cells 7 are supplied with air, I introduce air to the channel 10 by way of the valve 15 and in so doing, the diaphragm or wall 11 thereof is distended in the direction of the wall 12 so as to come into substantially flat engagement therewith. At this time, teat portions are produced in the diaphragm or wall 11 which enter the several openings 13 so as to positively seal these openings and thereby cut off all communication between the respective cells 7. When this is accomplished, the tire is provided with a pneumatic outer portion and a pneumatic concentric inner portion, and the diaphragm or wall 11 of the latter acts as a valve for closing all of said cells 7. Each cell 7, will be provided with substantially the same charge of air. Should one of the cells be punctured, the small pressure of air contained therein will hardly escape through the puncture on account of insufficient pressure. If it escapes at all, it will do so slowly and even though the tire has been punctured in line with a particular cell, it will not materially affect the tire. Should all of the air escape from the punctured cell, the other of the cells will remain intact and the tire, notwithstanding its puncture will still retain its buoyancy.

In addition to the formation of a tire or tube having a multiplicity of cells 7, the inner buoyant channel 10 gives an added measure of resiliency to the tire immediately at the rim of the wheel which rim forms part of said channel and is a factor of great importance in structures of this character.

In lieu of utilizing the diaphragm or wall 11 in the tubular portion 5 as a valve for all of the openings 13, any suitable well known form of valve can be substituted therefor. I further do not wish to limit myself with regard to the form of valves 14 and 15. One double acting valve of any suitable well known construction may take the place of both of the valves herein shown without departing from the spirit of the appended claims.

In addition to the diaphragm or wall 11 which I employ as a valve for the openings 13, I provide each of said cells 7 with a flap valve 13ª which acts to prevent the air in the cells from escaping into the space between said diaphragm or wall 11 and the adjacent walls of the cells when the tread of the tire is subjected to sudden impact. In this manner, I am able to retain in each cell the same quantity of air at all times.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

I claim:—

A tire comprising outer and inner concentric tubular portions, the outer tubular portion being divided into a plurality of air cells each of which is connected by an aperture in its inner wall with the inner tubular portion, and the said inner tubular portion being provided with and divided by a distensible diaphragm or wall therein into outer and inner channels, means to supply air to and check air under pressure in the outer channel of the inner tubular portion, and means to supply air to and check air under pressure in the inner channel of said inner tubular portion.

In testimony whereof I have affixed my signature.

ABRAHAM GRANAT.